United States Patent
Lection et al.

(10) Patent No.: US 7,280,843 B2
(45) Date of Patent: Oct. 9, 2007

(54) PLUG-AND-PLAY MASS STORAGE REFLECTOR

(75) Inventors: David B. Lection, Raleigh, NC (US); Eric L. Masselle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 10/675,507

(22) Filed: Sep. 30, 2003

(65) Prior Publication Data

US 2005/0070329 A1 Mar. 31, 2005

(51) Int. Cl.
*H04Q 7/20* (2006.01)
*H04B 1/38* (2006.01)
*H04B 5/00* (2006.01)

(52) U.S. Cl. .................. 455/556.1; 455/558; 455/41.1

(58) Field of Classification Search ............ 455/556.1, 455/557, 558, 412.1, 559, 41.1; 709/230
See application file for complete search history.

(56) References Cited

U.S. PATENT DOCUMENTS

| | | | | |
|---|---|---|---|---|
| 6,049,823 | A | 4/2000 | Hwang | 709/218 |
| 6,145,046 | A | 11/2000 | Jones | 710/129 |
| 7,024,225 | B2 * | 4/2006 | Ito | 455/558 |
| 2002/0032786 | A1 * | 3/2002 | Yamada et al. | 709/230 |
| 2002/0068558 | A1 | 6/2002 | Janik | 455/422 |
| 2002/0069245 | A1 | 6/2002 | Kim | 709/203 |
| 2002/0083264 | A1 * | 6/2002 | Coulson | 711/112 |
| 2002/0122410 | A1 | 9/2002 | Kulikov et al. | 370/349 |
| 2002/0150098 | A1 | 10/2002 | Sharony | 370/390 |
| 2003/0083101 | A1 * | 5/2003 | Feller | 455/557 |
| 2004/0180692 | A1 * | 9/2004 | Yang et al. | 455/557 |

OTHER PUBLICATIONS

"*Secure USB Flash Memory Drives and Token Security Solutions*", Unauthored article. <<http://www.eyenetwatch.com/USB_hard_drive/flsih_disk.htm>>.
"*USB Flash Drives*", Unauthored article. <<http//virology-online.com/FlashPens.htm>>.

* cited by examiner

Primary Examiner—Tilahun Gesesse
(74) Attorney, Agent, or Firm—Gregory M. Doudnikoff, Esq.; Steven M. Greenberg, Esq.; Carey Rodriguez Greenberg & Paul LLP

(57) ABSTRACT

A plug and play mass storage reflector. The mass storage reflector can include a wireless data transceiver coupled to a plug-and-play adapter configured for connection to a personal computing device, a device selector disposed in the reflector, and, device interface logic coupled both to the wireless data transceiver and the device selector. The device interface logic can be programmed to map mass storage in the personal computing device as specified by the device selector to a shared resource over a wireless network established through the wireless data transceiver. Importantly, the device interface logic can map the mass storage without exposing a peer-to-peer wireless network to a remote computing device.

15 Claims, 2 Drawing Sheets

PLUG-AND-PLAY MASS STORAGE REFLECTOR

BACKGROUND OF THE INVENTION

1. Statement of the Technical Field

The present invention relates to the field of plug-and-play mass storage and more particularly to shared plug-and-play mass storage.

2. Description of the Related Art

Plug-and-play mass storage has become the rage of the early twenty-first century. From solid state removable mass storage devices such as Compact Flash™, Smart Digital™, and Memory Stick™ technology, to mechanical platter based storage devices such as the Microdrive™, digital data no longer remains bound to the bulky and largely non-portable confines of the fixed disk drive. In the context of Compact Flash, Smart Digital and Memory Stick technologies, a proprietary interface ordinarily will be required. Though the various interface specifications have been widely publicized and standardized as a matter of course, the selection and inclusion of a proprietary interface within a computing design can be expensive, require end-user configuration and can consume excessive power.

In view of the traditional difficulties associated with coupling and engaging solid state removable mass storage devices through a proprietary interface to the personal computing device, recently it has become popular to couple and engage solid state removable mass storage devices through the existing input/output ports of the personal computing device. While hard and floppy disk drives, CD-ROM, DVD-ROM, DVD-R and CDR devices have been coupled to and engaged with personal computing devices through parallel and serial input/output ports, the use of the parallel and serial input/output port has never gained a level of ubiquity expected primarily due to the requirement that devices are attached therethrough prior to boot strap.

The universal serial bus (USB) specification addressed the principal concern of peripheral component manufactures in the ability of the USB port to dynamically activate and configure an attached device in a "plug-and-play" fashion. Since its introduction, the USB interface has rapidly become the interface of choice. To that end, USB mass storage devices barely the size of a human thumb have been popularized. USB mass storage devices of late include both flash memory configurations and Microdrive configurations. Thus, the USB interface presently provides an efficient mechanism for rapidly and effortlessly added mass storage to an operating personal computing device without requiring complicated configuration and a re-booting of the personal computing device.

Despite the advantages of portable mass storage devices which can be engaged "on the fly", more advanced computing configurations, particularly small computing workgroups and home office configurations can require a level of file sharing beyond the physical exchange of a mass storage device. To that end, peer-to-peer networking technologies always have formed a small, but significant component of the computer data communications marketplace. Initially wire-bound peer-to-peer networking technologies formed the basis of peer-to-peer network computing. More recently, peer-to-peer network computing has embraced inexpensive wireless networking technologies including the various 802.11x based devices and the shorter range Bluetooth™ devices. While Bluetooth principally has found its niche in close-range data exchanges such those between a PDA and desktop computer, or between headset and cellular telephone, 802.11x based devices have proven more applicable for larger scale applications including the formation of sophisticated wireless local area networks.

Through an established wireless local area network, individual personal computing devices can share each other's resources, including the physical mass storage devices of one another. Generally, to share a drive or a folder within a drive over an established network, one need only designate the drive or folder as a shared resource through the operating system. Subsequently, the contents of the drive or folder can be viewed and accessed by others in the peer-to-peer network, subject only the restrictions imposed by the operating system and, on occasion, by the end user.

Nevertheless, there are instances where it is desirable both to avoid coupling a computer to a peer-to-peer network, and also to share data only with a select group of individuals within a controlled, short range environment such as that more suited to short range radio frequency communications exemplified in the Bluetooth specification. Moreover, there are other occasions where one might seek to avoid configuration tasks associated with establishing a peer-to-peer network through which a resource can be shared. Yet, traditional peer-to-peer resource sharing can require one to perform some network configuration tasks which can inhibit less sophisticated users from capitalizing upon the peer-to-peer resource sharing tool.

SUMMARY OF THE INVENTION

The present invention addresses the deficiencies of the art in respect to sharing mass storage between two computing devices and provides a novel and non-obvious device, system, method and apparatus for plug-and-play mass storage resource sharing through the wireless ether. In a preferred aspect of the present invention, a wireless mass storage reflector can include a wireless data transceiver coupled to a plug-and-play adapter configured for connection to a personal computing device, a device selector disposed in the reflector, and, device interface logic coupled both to the wireless data transceiver and the device selector. The device interface logic can be programmed to map mass storage in the personal computing device as specified by the device selector to a shared resource over a wireless network established through the wireless data transceiver. Importantly, the device interface logic can map the mass storage without exposing a peer-to-peer wireless network to a remote computing device.

A plug and play system for wirelessly sharing files stored in mass storage can include at least two personal computers having respective plug-and-play input/output ports. At least one of the personal computers can include mass storage. Significantly, a wireless mass storage reflector can be coupled to one of the personal computers through a respective one of the plug-and-play input/output ports. Moreover, a companion wireless mass storage reflector can be coupled to another of the personal computers through a respective one of the plug-and-play input/output ports. Finally, each of the reflectors can have a wireless communicative coupling to each other. In this way, the personal computers can be configured to share files stored in the mass storage device over the wireless communicative coupling without exposing a peer-to-peer wireless network to the at least two personal computers.

In a method for sharing files in the system of the present invention, file access can be mapped to at least a portion of mass storage through a plug-and-play input/output port of a host computing device. A wireless communicative link can be established with a companion wireless data transceiver and shared file access to the mapped portion of the mass storage of the host computing device can be provided to the companion wireless transceiver through the wireless communicative link. Notably, the shared file access can be provided in such a way so that the shared file access appears as plug-and-play mass storage from the perspective of a client computing device hosting the companion wireless transceiver.

In a preferred aspect of the present invention, the mapping step can include specifying a selected portion of the mass storage externally from the host computing device and locating the selected portion in a device ring of the host computing device. Once located, the selected portion can be mapped for use by the client computing device. Yet, where security is of paramount importance, the method can further include the step of encrypting exchanges of files through the wireless communicative link. Moreover, the method can further include the step of limiting access to the mass storage over the wireless data network link to authenticated users.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a mass storage reflector, system, method and apparatus. In accordance with the present invention, a mass storage reflector can be configured for plug-and-play integration with a personal computing device such as a desktop or laptop computer. The mass storage reflector further can be configured with a wireless transceiver through which a wireless data communications network can be established with a companion wireless transceiver. A device selector can be disposed in the reflector and can select a specific portion of the mass storage for mapping to the reflector. Finally, device interface logic can map the specific portion of the mass storage to the reflector such that shared access to the specific portion can be granted to outside requestors over the wireless data communications network.

Figure 1:
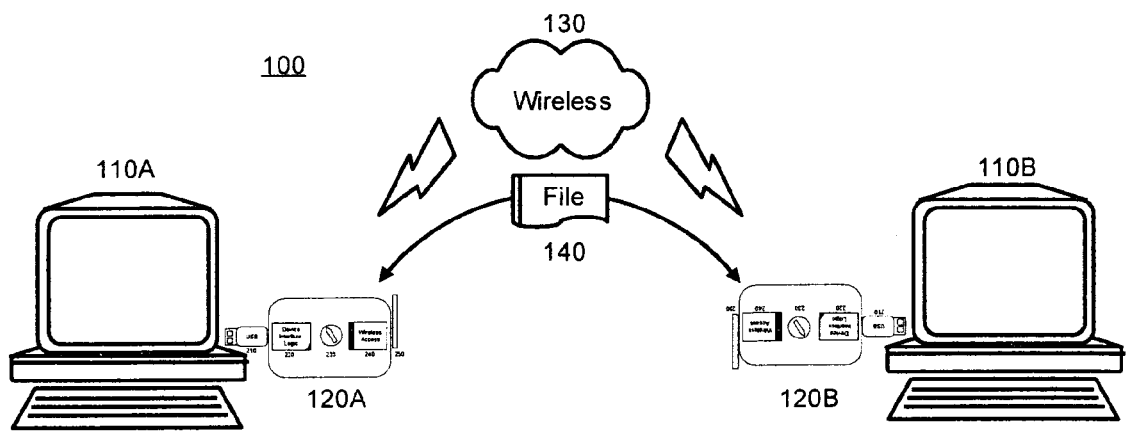
FIG. 1 is pictorial illustration of a system configured with the mass storage reflector of the present invention.

FIG. 1 is pictorial illustration of a system configured with the plug-and-play wirelessly shareable mass storage device of the present invention. The system 100 of the present invention can include two or personal computing devices 110A, 110B communicatively coupled to one another over a wireless data communications network 130. Each of the personal computing devices 110A, 110B can be configured with a plug-and-play mass storage reflector 120A, 120B. In this way, file resources 140 can be shared between the personal computing devices 110A, 110B over the wireless data communications network 130.

Each of the mass storage reflectors 120A, 120B can include a wireless transceiver for establishing and maintaining the wireless data communications network 130. Moreover, each of the mass storage reflectors 120A, 120B can further include plug-and-play logic for coupling each of the mass storage reflectors 120A, 120B to a respective personal computer 110A, 110B in a "plug-and-play" manner. Finally, each of the mass storage reflectors 120A, 120B can include device interface logic through which each of the mass storage reflectors 120A, 120B can map file access to a particular portion or all of a mass storage device in their respective personal computers 110A, 110B.

Figure 2:
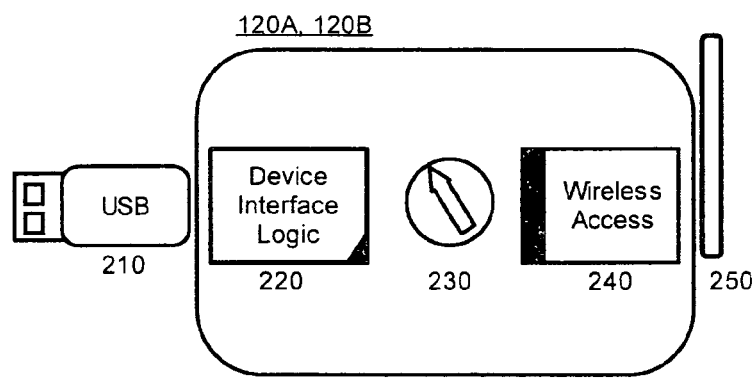
FIG. 2 is a schematic illustration of a preferred arrangement of the mass storage reflector of FIG. 1; and, FIG. 3 is a flow chart illustrating a process for wirelessly reflecting mass storage in the system of FIG. 1.

It will be recognized by the skilled artisan that the general principal of the present invention—the sharing of mass storage through a plug-and-play wireless data communications network without requiring the establishment and configuration of a conventional peer-to-peer network—can be embodied in several physically tangible forms and the invention is not to be limited to any specific physical arrangement. Notwithstanding, in a preferred arrangement as shown in FIG. 2, the mass storage reflector 120A, 120B of FIG. 1 can include a plug-and-play interface 210, for instance a USB interface, device interface logic 220, a device selector 230, wireless access circuitry and logic 240, and an antenna 250.

The wireless access circuitry and logic 240 in combination with antenna 250 can establish and maintain a wireless communications link with a companion wireless data transceiver. Specifically, the wireless access circuitry and logic 250 can include a wireless infrastructure for establishing and maintaining a wireless connection to other wireless devices operating within the same wireless network protocol. Examples include a personal area network formed through the Bluetooth protocol, and an 802.11x based wireless area network. To that end, wireless access circuitry and logic 250 can include any number of conventional implementations known in the art and described through reference designs for wireless data transceiver integrated circuits.

The device selector 230 can provide a user interface through which a portion of mass storage within a coupled personal computing device can be selected. Typically, the portion can include a logical drive selection. In the NT file system or in the DOS file system, the logical drive selection can be represented by a drive letter, for instance. The device selector 230 can include an analog or digital interface for specifying the drive selection. In any case, the device selector 230 can be coupled to the device interface logic 220 which can map a corresponding portion of mass storage as specified by the device selector 230 to the reflector 120A, 120B In this regard, the device interface logic 220 can provide circuitry and logic well known in the art for interfacing the reflector 120A, 120B to the personal computing device through a plug-and-play input/output port coupled to the plug-and-play interface 210. Through the device interface logic 220, the reflector 120A, 120B can be registered with the operating system of the personal computing device by conventionally routing a device ID to the device manager of the operating system. Additionally, through the device interface logic 220, the specified portion of mass storage can be selected through the device ring of the operating system so that the specified portion can be mapped to the operating system of a personal computing device coupled to a companion wireless transceiver.

Importantly, it will be recognized by the skilled artisan that the reflector 120A, 120B both can perform the function of resource server and resource client. As described above, the device interface logic 220 can perform the resource serving operation for providing wireless access to the specified portion of mass storage. By comparison, in the resource client mode, the device interface logic 220 can register with the operating system of the coupled personal computing device through the mass storage device driver so that the operating system views the reflector 120A, 120B merely as a USB mass storage device without regard to the wireless communications link. Hence, in operation once both reflectors 120A, 120B have been coupled to their respective personal computers, the mapped portion of the mass storage can be accessed wirelessly across both reflectors 120A, 120B without requiring the configuration of a peer-to-peer network.

Figure 3:
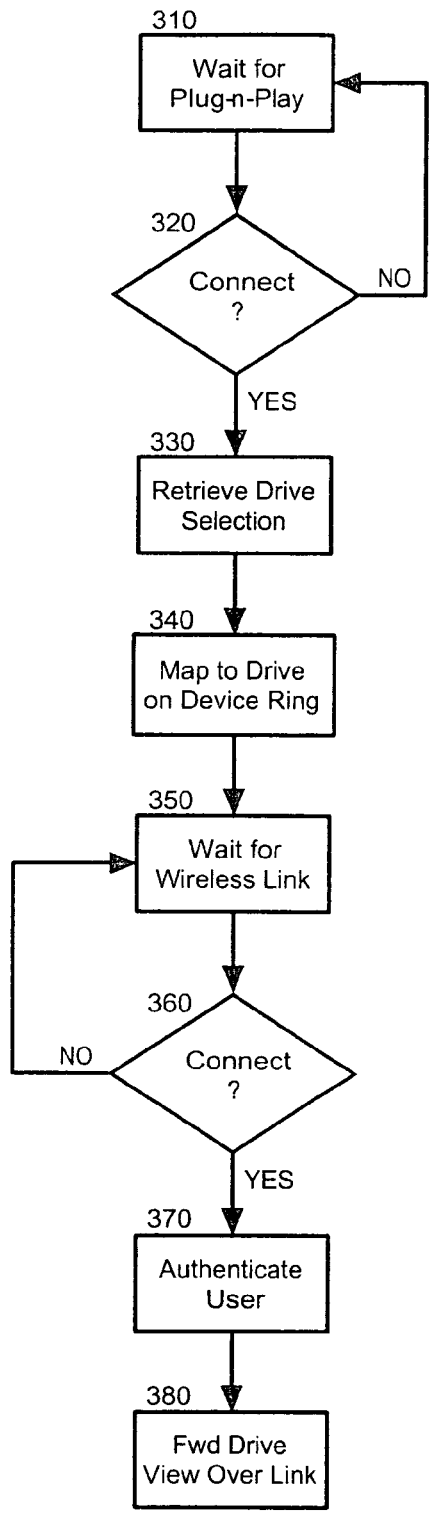

In more particular illustration, FIG. 3 is a flow chart illustrating a process for wirelessly reflecting mass storage in the system of FIG. 1. Beginning in block 310 and continuing through decision block 320, the reflector can wait until coupled to the plug and play input/output port of a host computing device. Once coupled, the drive selection of the reflector can be retrieved in block 330. In block 340, the selected drive can be located within the device ring of the host computing device and when located, the selected drive can be mapped within the reflector.

In block 350 and continuing through decision block 360, the reflector can wait until a wireless connection can be established with a companion reflector which has been registered with the mass storage device driver of a client computing device. Once connected, in block 370 an authentication process can apply security logic to the connection, such as the exchange of authentication keys. When authentication has been completed, the selected drive in the host computing device can be mapped to the assigned drive identity of the companion reflector. In this way, files and data stored in the selected drive can be shared over the wireless connection in block 380. Hence, the combination of the selected drive in the host computing device, both reflectors and the wireless connection can be viewed within the client computing device as plug-and-play mass storage in the absence of a peer-to-peer network.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A wireless mass storage reflector comprising:
   a wireless data transceiver coupled to a plug-and-play adapter configured for connection to a personal computing device;
   a device selector disposed in said reflector; and,
   device interface logic coupled both to said wireless data transceiver and said device selector and programmed to map mass storage in said personal computing device as specified by said device selector to a shared resource over a wireless network established through said wireless data transceiver without exposing a peer-to-peer wireless network to a remote computing device.

2. The device of claim 1, wherein said wireless data transceiver comprises a transceiver selected from the group consisting of a Bluetooth(TM) transceiver and an 802.11x transceiver.

3. The device of claim 1, wherein said plug-and-play adapter comprises a universal serial bus (USB) adapter.

4. The device of claim 1, further comprising security authentication and encryption logic programmed to apply security measures to said shared resource.

5. The system of claim 1, wherein said at least one wireless data transceiver comprises a transceiver selected from the group consisting of a Bluetooth(TM) transceiver and an 802.11x transceiver.

6. A plug and play system for wirelessly sharing files stored in mass storage comprising:
   at least two personal computers having respective plug-and-play input/output ports, wherein at least one of said at least two personal computers comprises mass storage; and,
   a wireless mass storage reflector coupled to one of said at least two personal computers through a respective one of said plug-and-play input/output ports, and a companion wireless mass storage reflector coupled to another of said at least two personal computers through a respective one of said plug-and-play input/output ports, said reflectors having a wireless communicative coupling to each other;
   whereby said personal computers are configured to share files stored in said mass storage device over said wireless communicative coupling without exposing a peer-to-peer wireless network to said at least two personal computers.

7. The system of claim 6, wherein said plug-and-play input/output ports comprises universal serial bus (USB) input/output ports.

8. A method for sharing files comprising the steps of:
   mapping file access to at least a portion of mass storage through a plug-and-play input/output port of a host computing device;
   establishing a wireless communicative link with a companion wireless data transceiver and, providing shared file access to said mapped portion of said mass storage of said host computing device to said companion wireless transceiver through said wireless communicative link so that said shared file access appears as plug-and-play mass storage from the perspective of a client computing device hosting said companion wireless transceiver.

9. The method of claim 8, wherein said mapping step comprises the steps of:

specifying a selected portion of said mass storage externally from said host computing device;

locating said selected portion in a device ring of said host computing device; and, mapping said selected portion for use by said client computing device.

10. The method of claim 8, further comprising the step of encrypting exchanges of files through said wireless communicative link.

11. The method of claim 8, further comprising the step of limiting access to said mass storage over said wireless data network link to authenticated users.

12. A machine readable storage having stored thereon a computer program for sharing files, the computer program comprising a routine set of instructions for causing the machine to perform the steps of:

mapping file access to at least a portion of mass storage through a plug-and-play input/output port of a host computing device;

establishing a wireless communicative link with a companion wireless data transceiver and, providing shared file access to said mapped portion of said mass storage of said host computing device to said companion wireless transceiver through said wireless communicative link so that said shared file access appears as plug-and-play mass storage from the perspective of a client computing device hosting said companion wireless transceiver.

13. The machine readable storage of claim 12, wherein said mapping step comprises the steps of:

specifying a selected portion of said mass storage externally from said host computing device;

locating said selected portion in a device ring of said host computing device; and, mapping said selected portion for use by said client computing device.

14. The machine readable storage of claim 12, further comprising the step of encrypting exchanges of files through said wireless communicative link.

15. The machine readable storage of claim 12, further comprising the step of limiting access to said mass storage over said wireless data network link to authenticated users.

* * * * *